H. MILLS.
RIM CONSTRUCTION.
APPLICATION FILED JAN. 21, 1913.
1,207,975.
Patented Dec. 12, 1916.
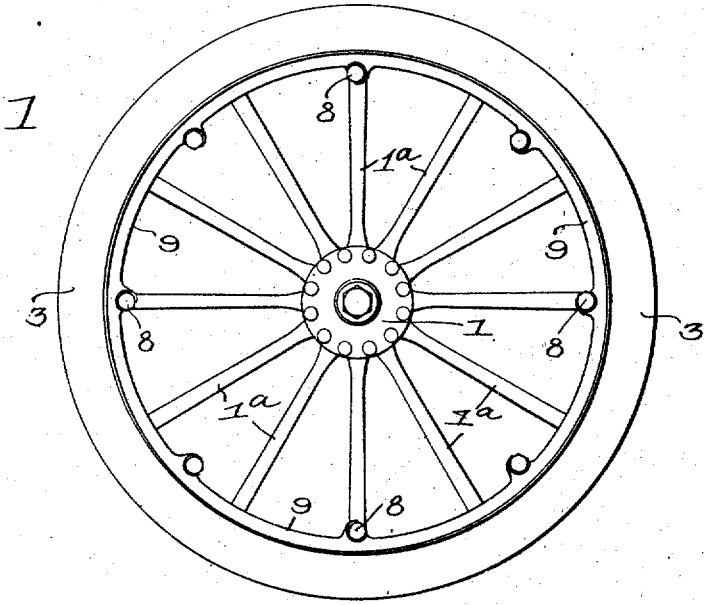
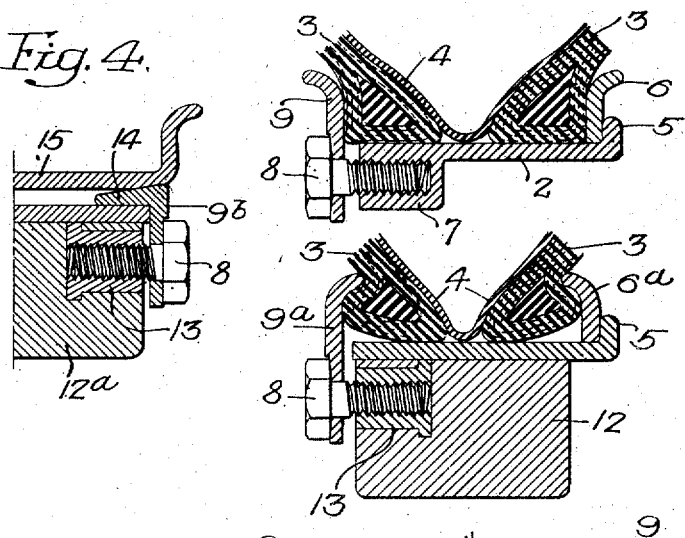

UNITED STATES PATENT OFFICE.

HARRY MILLS, OF PHILADELPHIA, PENNSYLVANIA.

RIM CONSTRUCTION.

1,207,975.      Specification of Letters Patent.      Patented Dec. 12, 1916.

Application filed January 21, 1913. Serial No. 743,324.

*To all whom it may concern:*

Be it known that I, HARRY MILLS, a citizen of the United States, residing in Philadelphia, Pennsylvania, have invented certain Improvements in Rim Construction, of which the following is a specification.

One object of my invention is to provide a relatively simple device for retaining any structure on the felly or rim of a wheel, of such construction that it may be removed or replaced with the greatest ease in order to permit of the convenient removal or replacing of the member or part which it ordinarily holds in place.

Another object of the invention is to provide a wheel with a retaining ring of novel construction, in combination with adjustable holding means, such as bolts, so arranged that after said bolts have been loosened or the outward pressure has been removed from said ring, the latter may be brought into a removable position by rotation through a relatively small angle, and thereafter be lifted off of the holding means by being drawn outwardly from the wheel.

These objects I attain as hereinafter set forth, reference being had to the accompanying drawings, in which, Figure 1 is a side elevation of a wheel equipped with my invention; Fig. 2 is an enlarged transverse section of a portion of the wheel shown in Fig. 1; Figs. 3 and 4 are transverse sections showing slightly modified forms of my invention, and Fig. 5 is a fragmentary side elevation of that form of retaining ring shown in Figs. 2 and 3.

In the above drawings, 1 represents the hub and 2 the rim of a wheel, on the latter of which is mounted any desired form of tire, consisting, in the case shown in Fig. 2, of a shoe 3 and an inner tube 4. In this particular case, one edge of the rim is provided with an upwardly extending flange 5 by which the tire retaining ring 6 is held in place in the well known manner. In the present instance, the said rim is provided with any suitable number of lugs 7 projecting inwardly from its inner surface and having threaded openings adjacent the unflanged edge of the rim for the reception of bolts 8.

For engaging and holding that side of the tire shoe adjacent the unflanged edge of the rim, I provide a ring 9 whose outer edge, like that of the ring 6, is outwardly curved or flared and has a series of open sided recesses 10 for the reception of the bolts 8, so arranged that the rotation of the ring 8 through a small arc about the center of the wheel, will cause said bolts to be brought into these recesses or permit the ring to be freed from said bolts, as the case may be. Moreover, the internal diameter of the ring 9 is such or said ring is so formed that when the bolts are altogether free of their respective recesses, it will just clear their heads and may be completely removed from the wheel by being drawn outwardly over them. It will further be noted that concentric with each of the recesses 10, the outer face of the ring 9 is counter-sunk as indicated at 11 for the reception of the bolt heads, the arrangement being such that when the latter lie within the counter-sunk recesses, it is not possible for the ring to be rotated.

Under conditions of use, if it be desired to remove the tire 3—4 from the rim 2, it is only necessary that the parts resting on the rim be pushed toward each other, or if desired, that the bolts be partially unscrewed, whereupon it is possible to give the ring 9 a rotation through a small angle in the direction of the arrow Fig. 5. It may be then freed from the bolts 8, it being of course necessary that it be pushed inwardly toward the rim before it is turned in order to free the heads of the bolts from the sides of the counter-sunk recesses 11, in case the bottom portions of the shoe 3 are moved toward each other instead of partially unscrewing the bolts. Obviously, the ring may now be drawn outwardly over the heads of the bolts 8 which, as before noted, are at such a distance from the center of the wheel as to permit of this action. The tire may now be easily removed from the rim without loss of time, and when it is desired to reassemble the various parts, said tire is again placed upon the rim and after the ring 9 has been put in place over the heads of the bolts 8, it is turned in a direction the reverse of that indicated by the arrow in Fig. 5, until said bolts are fully entered in their respective recesses. The latter may now be screwed up until their heads enter the counter-sunk recesses 11, or if the bolts are already set up to the desired point, the tire may be inflated so as to cause the proper functioning of the parts.

In Fig. 3 I have shown a slightly modified form of my invention in which the wheel is provided with a wooden felly 12 having metallic sockets 13 set therein and provided with threaded holes for the bolts 8. In this instance, however, the tire 3—4 is of the clencher type so that the ring 6ª has its outer edge curved inwardly as has also the removable ring 9ª. This as before, is countersunk for the reception of the bolt heads 8 and is thus held from accidental movement relatively to the bolts after these have been set up under working conditions.

It is obvious that the invention is by no means confined to use in connection with rims and tires of the construction shown in the above described drawings, since it may be used whenever it is desired to removably retain any structure of a similar nature in place on the felly or rim of a wheel. For example, in Fig. 4 I have shown a portion of a demountable rim structure in which the removable ring 9ᵇ is provided with any suitable number of the inwardly extending wedges 14 whereby the body 15 of the rim is properly held in place on the felly 12ª. As before, this ring 9ᵇ is employed in connection with a series of bolts or other suitable structures, screwed into or attached to the felly or other wheel part mounted on the spokes 1ª and has recesses open at one side to permit of its engagement with or disengagement from said holding structures by a slight rotary movement;—the internal diameter of the ring being locally or wholly such that when the holding structures are clear of its recesses, it may be drawn off over their heads.

From the above it will be seen that my improved holding or retaining ring is applicable not only to keep a tire on a rim but also to hold a removable or other similar rim on a wheel.

I claim:—

1. The combination in a wheel of a member removably mounted thereon; and holding means for said member consisting of a series of bolts adjustably threaded into the wheel; with a flat retaining ring provided with inwardly projecting portions having open sided recesses for the reception of said bolts.

2. The combination in a wheel of a rim having a series of threaded sockets; a tire mounted on said rim; means for holding the tire in place consisting of a ring provided with a series of open sided recesses; and bolts mounted in the sockets in positions to enter the recesses of the ring, the latter being removable from the bolts by a rotary movement and the outer face of the ring being counter-sunk adjacent the recesses to prevent such rotary movement when the bolts are not set up.

3. The combination in a wheel of a rim having a series of threaded sockets; a tire mounted on said rim; means for holding the tire in place consisting of a ring having a flat portion in a plane at right angles to the axis of the wheel and provided at its inner edge with inwardly projecting portions formed with open sided recesses, the outer face of said ring being counter-sunk around said recesses; with bolts mounted in the sockets in positions to enter the recesses of the ring through the openings thereof.

In testimony whereof, I have signed my name to this specification, in the presence of two subscribing witnesses.

HARRY MILLS.

Witnesses:
WILLIAM E. BRADLEY,
JOS. H. KLEIN.